United States Patent [19]
Abe

[11] Patent Number: 5,161,830
[45] Date of Patent: Nov. 10, 1992

[54] PIPE JOINT

[75] Inventor: Minoru Abe, Neyagawa, Japan

[73] Assignee: Kabushiki Kaisha Daikin Seisakusho, Osaka, Japan

[21] Appl. No.: 721,623

[22] PCT Filed: Nov. 8, 1990

[86] PCT No.: PCT/JP90/01451
§ 371 Date: Jul. 19, 1991
§ 102(e) Date: Jul. 19, 1991

[87] PCT Pub. No.: WO91/08413
PCT Pub. Date: Jun. 13, 1991

[30] Foreign Application Priority Data

Nov. 27, 1989 [JP] Japan .................. 1-137748[U]

[51] Int. Cl.$^5$ ............................................. F16L 37/00
[52] U.S. Cl. ................................... 285/178; 285/317; 285/319; 285/921; 285/924; 285/369
[58] Field of Search ............... 285/178, 317, 319, 233, 285/921, 924, 369

[56] References Cited

U.S. PATENT DOCUMENTS

| | | | |
|---|---|---|---|
| 3,933,378 | 1/1976 | Sandford et al. | 285/924 X |
| 4,436,326 | 3/1984 | Peaster | 285/233 X |
| 4,696,497 | 9/1987 | Schwarzensteiner | 285/319 X |

FOREIGN PATENT DOCUMENTS

| | | | |
|---|---|---|---|
| 1235081 | 2/1967 | Fed. Rep. of Germany | 285/178 |
| 581307 | 11/1977 | U.S.S.R. | 285/178 |

Primary Examiner—Randolph A. Reese
Assistant Examiner—Timothy Aberle
Attorney, Agent, or Firm—Armstrong & Kubovcik

[57] ABSTRACT

A pipe joint having a pipe (11) including an outward facing flange (17), a joint body (10), and a tubular fixture (20) covering an outer peripheral part of the joint body (10) and coupling to the pipe (11) with joint body (10). The tubular fixture (20) is composed of springy claws (25) and an inward facing flange (21), so that an assembly work can be simplified and a manufacturing cost can be reduced owing to a decrease in a quantity of parts.

3 Claims, 3 Drawing Sheets

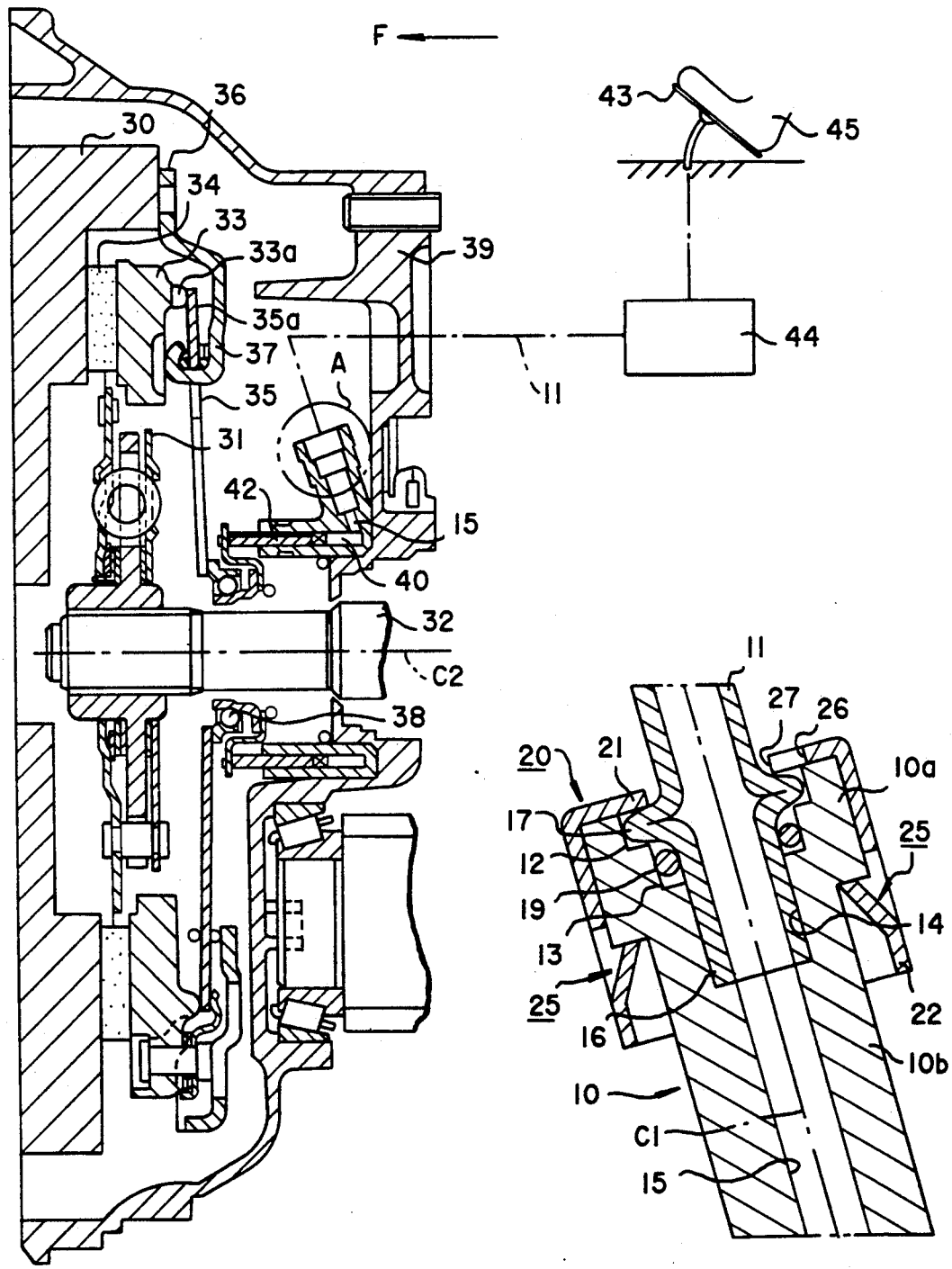

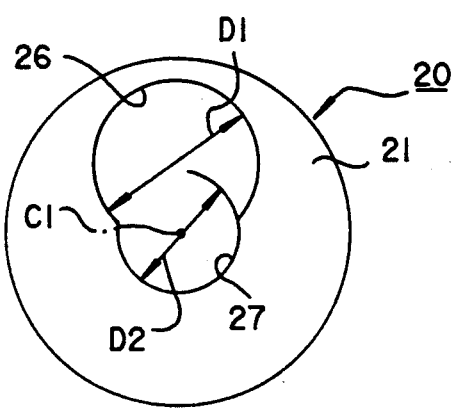
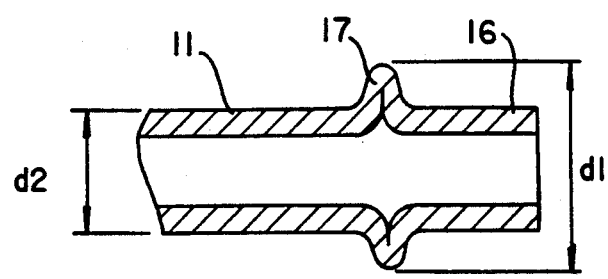
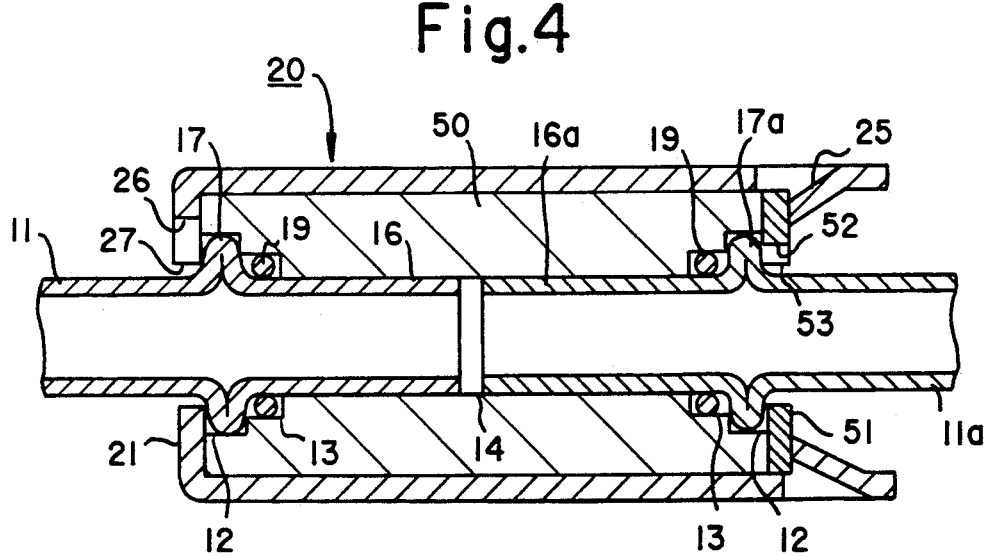
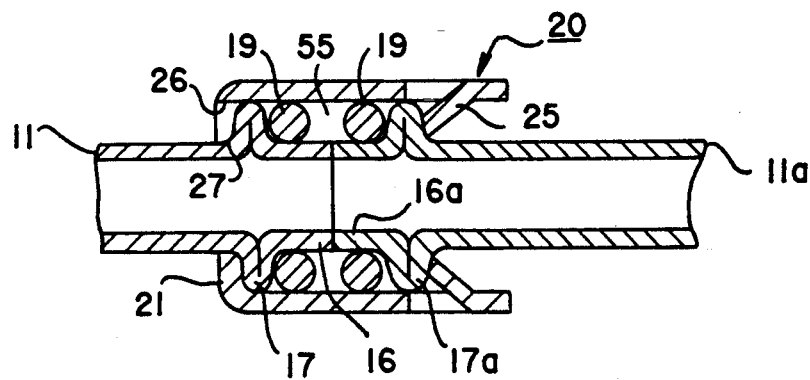

PIPE JOINT

TECHNICAL FIELD

This invention relates to a pipe joint for use in a hydraulic circuit etc.

BACKGROUND ART

As illustrated in FIG. 6, this kind of prior art pipe joint 100 is generally equipped with a pipe 102 which has an outward facing flange 101 in the vicinity of its tip end portion, an annular joint body 103 in one side (left side of FIG. 6) inner peripheral part of which the pipe tip end portion fits, and a tubular fixture 105 which covers an outer peripheral part of the joint body 103 and couples the pipe 102 to the joint body 103.

An inward facing flange 106 fronting on the outward facing flange 101 is formed integrally on one end of the tubular fixture 105, and female threads 107 are cut on an inner peripheral surface of the other end of the fixture 105. The female threads 107 are screwed onto male threads 108 cut on an outer peripheral surface of the joint body 103, so that the pipe 102 is coupled to the joint body 103.

In this structure, however, such a method is employed that coupling work is accomplished by screwing the female threads 107 of the fixture 105 onto the male threads 108, so that the structure requires a time and man power for its assembly process and is not suitable for mass production. Further, since the fixture 105 should always be fitted onto the pipe 102, the structure is unfavorable from the standpoint of storage and transportation.

In order to solve the above problem, such a structure is also well known that has an outward facing flange formed in the vicinity of tip end portion of a first pipe, a stopping member mating immovably with a side surface opposite to a tip end of the outward facing flange, a sealing member fitted onto an outer periphery of the tip end portion of the pipe, a second pipe surrounding an outer periphery of the sealing member so as to compress it, a spacer extending integrally from the second pipe and covering an outer periphery of the first pipe with a radial clearance left between them, and a stopping hole formed on an outer periphery of end portion of the spacer; the stopping member being provided with a pressing projection which is so formed as to be deformed elastically in the radial direction and rests in the stopping hole, and the pressing projection having a stopping groove in which an edge of the stopping hole rests so as to limit an elastic deformation of the pressing projection when the first pipe moves in a direction as leaving from the second pipe. (Japanese Unexamined Utility Model Publication No. 62-181788).

In this structure, however, the spacer and the stopping member are necessary other than the first and second pipes. Therefore, a quantity of parts becomes large to increase manufacturing cost.

An object of the invention is to solve the above-mentioned problem.

DISCLOSURE OF THE INVENTION

In order to solve the above-mentioned problem, this invention provides a pipe joint having a pipe which includes an outward facing flange in the vicinity of its tip end, an annular joint body in one-end side inner peripheral part of which a pipe tip end portion press fits, and a tubular fixture which covers an outer peripheral part of the joint body and couples the pipe to the joint body; characterized by that the tubular fixture integrally has a springy claw which is cut and raised from an other peripheral wall side to an inner peripheral side in an axial direction so that the claw gets near to an axis line as it comes to the above-mentioned one end side of the joint body, and an inward facing flange which is formed on one end of the tubular fixture and inhibits the outward facing flange from slipping out of the joint body by means of a clamping force created between it and the claw; the inward facing flange being provided with an eccentric hole for passing the outward facing flange and an axis hole for passing the pipe neighboring with the eccentric hole.

According to the present invention, the tubular fixture is coupled to the pipe through the eccentric hole and the axial hole when it is assembled. Then, the pipe tip end portion is made fit in the tip end of the joint body under a state where the tubular fixture is connected to the pipe, and an inner peripheral part of the tubular fixture is further made fit onto an outer peripheral part of the joint body, so that the claw is expanded outwardly in a radial direction to rest in a specified position.

BRIEF DESCRIPTION OF THE DRAWINGS

FIG. 1 is a schematic vertical section view of a clutch assembly to which a pipe joint of a first embodiment is applied.

FIG. 1a is an enlarged vertical sectional partial view of FIG. 1

FIG. 2 is a front view of an inward facing flange of the pipe joint.

FIG. 3 is a schematic vertical sectional partial view of a pipe of the pipe joint.

FIG. 4 is a schematic sectional view showing a pipe joint of a second embodiment.

FIG. 5 is a schematic sectional view showing a pipe joint of a third embodiment.

BEST MODE FOR CARRYING OUT THE INVENTION

Figure 6:
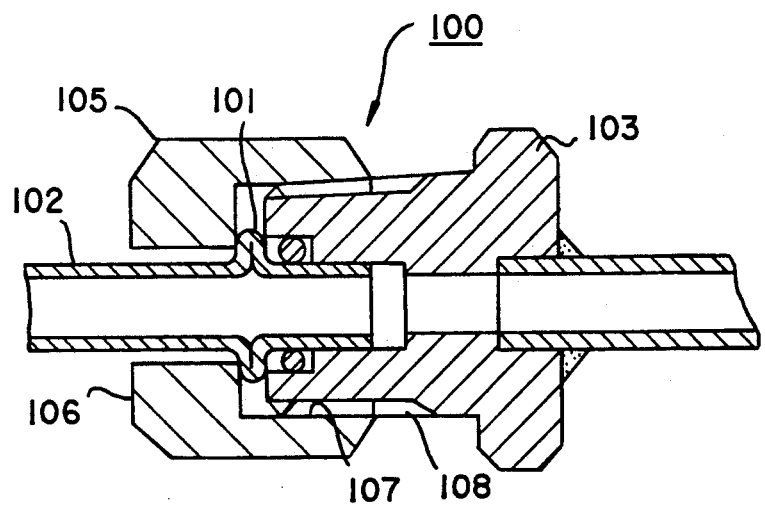
FIG. 6 is a schematic sectional view showing a conventional pipe joint.

In the following embodiments, same symbols are attached to corresponding parts and duplicate explanation will be avoided.

First embodiment

FIG. 1 shows an embodiment wherein the present invention is applied to a piping of a clutch operating cylinder called generally as CSC (abbreviation of concentric slave cylinder), and a left side of FIG. 1 represents a front side. FIG. 1a is an enlarged view of A part of FIG. 1. As illustrated in FIG. 1a, the pipe joint of this invention is equipped with a joint body 10 made of resin and a pipe 11 made of metal.

The joint body 10 has concentrically, in consecutive order from its end, an annular large opening port 12, a small opening port 13 connecting with the large opening port 12, and a small pipe coupling port 14 connecting with the small opening port 13 and having a smaller diameter than that of the small opening port 13; and the small pipe coupling port 14 connecting with an oil passage 15. A side wall 10a, which partitions the large opening port 12 from the small opening port 13 of the joint body 10, extends outwardly in the radial direction beyond a side wall 10b which partitions the pipe coupling port 14. A tubular fixture 20, which will be described later, fits onto the side wall 10a.

A part in the vicinity of a tip end 16 of the pipe 11 is compressed by a press work, for example, in a direction of axis line C1 so that an outward facing flange 17 extending outwardly in the radial direction is integrally formed. A diameter d1 (FIG. 3) of the outward facing flange 17 is made a little smaller than that of the large opening port 12. The pipe tip end portion 16 fits in the pipe coupling port 14 through the small opening port 13, and a clearance between the pipe tip end portion 16 and the small opening port 13 is sealed by an O-ring 19.

The tubular fixture 20 is an integral forming part made of mild steel, for example, and includes integrally an inward facing flange 21 fronting on the outward facing flange 17 and a peripheral wall 22 fronting on the side wall 10b of the joint body.

Claws 25 are cut and raised from the peripheral wall 22 to an inner peripheral side in the axial direction in such a way as spaced 180° for example. Each claw 25 extends in such a position that it gets near to the axis line as it comes to the side wall 10a side, and works as a spring member freely expandable in the radial direction of the joint. A tip end of the claw 25 rests against a stepped portion formed by the side wall 10a and the side wall 10b. This structure inhibits the outward facing flange 17 from slipping out of the large opening port 12 by a clamping force created between it and the claw 25, even if the inward facing flange 21 is pushed in a direction to cause the outward facing flange 17 to leave the joint body 10.

As shown in FIG. 2, an eccentric hole 26 and an axis hole 27 neighboring with the eccentric hole 26 are made on the inward facing flange 21. Assuming that a diameter of the eccentric hole 26 is D1, a diameter of the axis hole 27 is D2, a diameter of the outward facing flange 17 is d1 and a diameter of the pipe 11 is d2 as shown by FIG. 3; dimensions of them are so set as to satisfy the following equations:

$$D1 > d1, D2 > d2$$

According to the above structure, the tubular fixture 20 is first coupled to the pipe 11 through the eccentric hole 26 and the axis hole 27 in order to couple the pipe joint of this invention. In the next stage, the pipe tip end portion 16 is fitted in the small opening port 13 of the joint body 10 and the outward facing flange 17 is fitted in the large opening port 12 respectively, under a state where the tubular fixture 20 is coupled to the pipe 11 as it is. The O-ring 19 is to be previously fitted onto the pipe tip end portion 16, in this instance. Then, an inner peripheral part of the tubular fixture 20 is fitted onto an outer peripheral part of the side wall 10a of the joint body. The claws 25 are thereby opened outward in the radial directions and pass through the side wall 10a, and rest against the stepped portion of the side wall 10a as shown by FIG. 1.

In FIG. 1, 30 is a flywheel and 31 is a clutch disc which spline fits onto an output shaft 32 (input shaft of transmission). 33 is a pressure plate which presses a friction facing 34 located at an outer peripheral part of the clutch disc 31 against the flywheel 30. 35 is a diaphragm spring, and its outer peripheral part 35a is always seated on a projection 33a of the pressure plate 33 to urge the pressure plate 33 to the front side. 36 is a clutch cover, and its outer peripheral part is secured to the flywheel 30 and its inner peripheral part supports the diaphragm spring 35 through a pair of wire rings 37. 38 is a release bearing which is installed in a slidable manner in a direction of axis line C2 of the output shaft 32 and presses on a backside of the diaphragm spring 35 when a clutch is disengaged. 39 is a housing. The joint body 10 of this invention is secured to an inner peripheral part of front face of the housing 39 and the oil passage 15 connects with an annular cylinder 40 in the housing 39. The cylinder 40 is formed concentrically with the axis line C2 and opens to an inner peripheral part of the backside of the diaphragm spring 35. A rear end of a cylindrical piston 42 is fitted in the cylinder 40 in a slidable manner, and the piston 42 is slidden by working oil in the cylinder 40 in parallel with the axis line C2. A tip end of the piston 42 is connected to the release bearing 38. 43 is a clutch pedal and 44 is a master cylinder.

Function will be described hereunder. When a driver 45 treads on the clutch pedal 43, working oil under pressurized state is supplied from the master cylinder 44 through the pipe 11 to the oil passage 15 and the cylinder 40. The piston 42 is thereby moved forward to shift the release bearing 38 forward. Consequently, the release bearing 38 presses a backside face of the diaphragm spring 35, so that the outer peripheral part 35a of the diaphragm spring 35 is moved backward with the wire rings 37 set as its fulcrum point. Accordingly, a pressing force by which the pressure plate 33 pushes the friction facing 34 to the flywheel 30 is weakened so that the clutch is disengaged.

Considerable magnitude of vibration and load will be produced on a coupling portion between the joint body 10 and the pipe 11 during the above operation, however there is no chance for oil to leak because the inward facing flange 21 of the tubular fixture 20 clamps the outward facing flange 17. Further, even when the pipe joint is installed in such a narrow space, the pipe connection work can be carried out simply and easily by only inserting the tip end 16 of the pipe 11 into the pipe coupling port 14.

Second embodiment

In an embodiment illustrated by FIG. 4, a structure is shown wherein a pair of pipes 11 & 11a having outward facing flanges 17 & 17a are coupled in a state where tip ends 16 & 16a are fronting each other. In the structure shown by FIG. 4, a joint body 50 is formed symmetrically about vertical plane, and the claw 25 rests against the other end face (right side face of FIG. 4) of the joint body 50 through a washer 51. Thereby, an inner peripheral part of the washer 51 works as an inward facing flange for stopping the other outward facing flange 17a. In this embodiment, holes 52 & 53 same as the eccentric hole 26 and the axis hole 27 are made on the washer 51 too.

Even in case of the structure of FIG. 4, the one-side pipe 11 is first coupled to the tubular fixture 20 through the eccentric hole 26 and the axis hole 27 of the tubular fixture 20, and the pipe tip end portion 16 is then fitted in the pipe coupling port 14 of the joint body 50 and the outward facing flange 17 is fitted in the small opening port 13 respectively, under the state where the tubular fixture 20 is coupled to the pipe 11 as it is. Also in this case, the O-ring 19 is to be previously fitted onto the pipe tip end portion 16. Further, the other pipe tip end portion 16a onto which the O-ring 19 fits is fitted in the other end of the pipe coupling port 14 in the same way as above, under a state where the washer 51 is previously installed at the backside of the outward facing flange 17a. Then, the inner peripheral part of the tubular fixture 20 is fitted onto the outer peripheral part of the joint body 50. The claw 25 is thereby opened outward in the radial direction and passes through the side wall, and rests against the other end face of the joint body 50 through the washer 51 as shown by FIG. 1.

Third embodiment

In an embodiment illustrated by FIG. 5, a structure is shown wherein the joint body 50 and the washer 51 in the structure of FIG. 4 are further eliminated, and the pipe tip end portions 16 & 16a are butted each other in a concentric manner. In this structure, a pair of O-rings 19 seal an inner peripheral surface of the tubular fixture 20 and outer peripheral surfaces of the pipe tip end portions 16 & 16a.

Also in case of the structure of FIG. 5, the one-side pipe 11 is coupled to the tubular fixture 20 in the same way as the structure of FIG. 4. Then, the other-side pipe tip end portion 16a is butted to the one-side pipe tip end portion 16 under a state where the O-rings 19 are previously fitted onto the pipe tip end portions 16 & 16a. And, from this state, an inner peripheral part of the tubular fixture 20 is fitted onto the one-side outward facing flange 17 and further onto the other-side outward facing flange 17a. The claw 25 is thereby opened outward in the radial direction and passes through the both flanges 17 & 17a successively and rests against the outward facing flange 17a as shown by FIG. 5.

Incidentally, when embodying the structure of FIG. 5, a ring-shaped joint body is disposed in a clearance 55 between the O-rings 19 so that the pipe tip end portions 16 & 16a may be connected. Further, the above ring-shaped joint body is made of an elastic rubber so that the 0-rings 19 may be omitted.

As described above, the present invention makes use of the tubular fixture 20 having the inward facing flange 21 and the claw 25, and the inward facing flange 21 includes the eccentric hole 26 for passing the outward facing flange 17 and the axis hole 27 for passing the pipe 11 neighboring with the eccentric hole 26; so that the pipe connection work can be carried out simply in a short time by only inserting the pipe tip end portion 16 of the pipe 11 into the one-end inner peripheral part of the joint body 10. Accordingly, the mass production can be accomplished easily and the automation of assembly work will become possible by employing the present invention. Further, since this invention makes use of the tubular fixture 20 having the inward facing flange 21 and the claw 25, it becomes possible not only to provide the pipe joint easy to set up but to decrease the number of parts and reduce the manufacturing cost.

What is claimed is:

1. A pipe joint having a pipe which includes an outward projecting flange adjacent an end portion of said pipe, an annular joint body having, in one end, an inner peripheral part into which said pipe end portion press fits, and a tubular fixture for covering an outer peripheral part of said joint body and coupling said pipe to said joint body; characterized by that said tubular fixture has, adjacent one of its ends, an integral springy claw cut and raised from a peripheral wall of said tubular fixture to an inner peripheral side of said tubular fixture in an axial direction of said tubular fixture so that said claw springs toward an axis line of said tubular fixture as said claw comes to said one end side of said joint body, and an integral inward projecting flange formed at the other end of said tubular fixture and inhibits said outwardly projecting flange from slipping out of said joint body by means of a clamping force between said inwardly facing flange and said claw; said inward projecting flange having an eccentric hole being eccentric relative to said axis line for passing said outward projecting flange through said inward projecting flange of said tubular fixture and an adjoining hole in axial alignment with said tubular fixture for passing said pipe through said inward projecting flange of said tubular flange.

2. A pipe joint having a first pipe which includes an outward projecting flange adjacent an end portion of said pipe, a second pipe which includes an outward projecting flange adjacent an end portion of said second pipe, said end portion of said second pipe butting concentrically said end portion of said first pipe, a tubular fixture coupling said pipes and covering said outward projecting flanges of both said pipes, and a pair of O-rings between an inner peripheral surface of said tubular fixture and outer peripheral surfaces of said pipe end portions for forming a seal therebetween; characterized by that said tubular fixture has, at one of its end, an integral inward projecting flange for engaging a backside face of said outward projecting flange of said first pipe, and an integral springy claw cut and raised from a peripheral wall of said tubular fixture to an inner peripheral side of said tubular fixture in an axial direction of said tubular fixture so that said claw springs toward an axis line of said tubular fixture as said claw comes to said outward projecting flange of said second pipe for engaging a backside face of said outward projecting flange of said second pipe; said inward projecting flange having an eccentric hole being eccentric relative to said axis lien for passing said outward projecting flange through said inward projecting flange of said tubular fixture and an adjoining hole in axial alignment with said tubular fixture for passing said pipes through said inward projecting flange of said tubular fixture.

3. A pipe joint as set forth in claim 2, which includes a member fitted between outer peripheral surfaces of said pipe end portions and an inner peripheral surface of said tubular fixture.

* * * * *